(12) United States Patent
Teng

(10) Patent No.: US 12,001,399 B2
(45) Date of Patent: Jun. 4, 2024

(54) SYSTEMS AND METHODS FOR STORAGE MEDIUM MANAGEMENT

(71) Applicant: ZHEJIANG DAHUA TECHNOLOGY CO., LTD., Zhejiang (CN)

(72) Inventor: Kaien Teng, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 523 days.

(21) Appl. No.: 17/241,014

(22) Filed: Apr. 26, 2021

(65) Prior Publication Data

US 2021/0248109 A1   Aug. 12, 2021

Related U.S. Application Data

(63) Continuation of application No. PCT/CN2019/114345, filed on Oct. 30, 2019.

(30) Foreign Application Priority Data

Nov. 2, 2018 (CN) .......................... 201811299939.7

(51) Int. Cl.
*G06F 16/17* (2019.01)
*G06F 16/23* (2019.01)

(52) U.S. Cl.
CPC ...... *G06F 16/1724* (2019.01); *G06F 16/2365* (2019.01)

(58) Field of Classification Search
CPC ..... G06F 16/119; G06F 16/162; G06F 16/182
(Continued)

(56) References Cited

U.S. PATENT DOCUMENTS 8,819,375 B1 *  8/2014  Pruett .................... G06F 13/28
                                                      707/693
9,792,298 B1 * 10/2017  Taylor ................. G06F 16/1844
(Continued)

FOREIGN PATENT DOCUMENTS

CN        105471930 A      4/2016
CN        107145452 A      9/2017
(Continued)

OTHER PUBLICATIONS

The Extended European Search Report in European Application No. 19879365.5 dated Oct. 7, 2021, 9 pages.
(Continued)

*Primary Examiner* — Hicham Skhoun
(74) *Attorney, Agent, or Firm* — METIS IP LLC

(57) ABSTRACT

The present disclosure relates to a system and method for managing files stored in a storage medium. The method may include obtaining file information of a file stored in the storage medium, wherein the file includes at least two data fragments, each two of the at least two data fragments are stored separately in two discontinuous storage units in the storage medium. The method may also include determining a first parameter of the file according to the file information, wherein the first parameter represents an integrity of the at least two data fragments in the storage medium. The method may further include determining whether the first parameter is equal to or smaller than a preset threshold. The method may still further include defragmenting the at least two data fragments in the storage medium if the first parameter is equal to or smaller than the preset threshold.

14 Claims, 9 Drawing Sheets

(58) Field of Classification Search
USPC .......................................................... 707/693
See application file for complete search history.

(56) References Cited

U.S. PATENT DOCUMENTS

| | | | | |
|---|---|---|---|---|
| 2004/0148476 A1* | 7/2004 | Altare | ................... | G06F 3/0676 |
| | | | | 711/159 |
| 2008/0208922 A1 | 8/2008 | Wolas-Shiva et al. | | |
| 2008/0270742 A1* | 10/2008 | Huang | .................... | G06F 3/061 |
| | | | | 711/209 |
| 2011/0099326 A1* | 4/2011 | Jung | ..................... | G06F 3/0679 |
| | | | | 711/E12.001 |
| 2011/0113207 A1* | 5/2011 | Fiske | ................. | G06F 16/1724 |
| | | | | 711/E12.001 |
| 2014/0156610 A1* | 6/2014 | Akers | ................. | G06F 16/1724 |
| | | | | 707/693 |
| 2014/0229657 A1* | 8/2014 | Karamov | .............. | G06F 3/0616 |
| | | | | 711/103 |
| 2014/0369249 A1* | 12/2014 | Mikhailov | .............. | H04W 4/06 |
| | | | | 370/312 |
| 2015/0220550 A1* | 8/2015 | Duzly | .................... | G06F 16/00 |
| | | | | 707/693 |
| 2015/0220551 A1 | 8/2015 | Duzly et al. | | |
| 2019/0102105 A1* | 4/2019 | Bergman | .............. | G06F 3/0673 |

FOREIGN PATENT DOCUMENTS

| | | |
|---|---|---|
| CN | 107656939 A | 2/2018 |
| CN | 107885458 A | 4/2018 |
| WO | 2015119786 A1 | 8/2015 |
| WO | 2020088525 A1 | 5/2020 |

OTHER PUBLICATIONS

International Search Report in PCT/CN2019/114345 dated Feb. 1, 2020, 5 pages.

Written Opinion in PCT/CN2019/114345 dated Feb. 1, 2020, 6 pages.

* cited by examiner

400

```
┌─────────────────────────────────────────────────────────┐  410
│ Obtaining file information of a file stored in the      │
│ storage medium, wherein the file includes at least two  │
│ fragments, and each two of the at least two fragments   │
│ are stored separately in two storage regions            │
│ discontinuously distributed in the storage medium       │
└─────────────────────────────────────────────────────────┘
                            │
                            ▼
┌─────────────────────────────────────────────────────────┐  420
│ Determining a first parameter of the file according to  │
│ the file information, and determining whether the first │
│ parameter is equal to or smaller than a preset          │
│ threshold, wherein the first parameter represent an     │
│ integrity of the at least two fragments in the storage  │
│ medium                                                  │
└─────────────────────────────────────────────────────────┘
                            │
                            ▼
┌─────────────────────────────────────────────────────────┐  430
│ defragmenting the at least two fragments in the storage │
│ medium if the first parameter is equal to or smaller    │
│ than the preset threshold                               │
└─────────────────────────────────────────────────────────┘
```

FIG. 4

SYSTEMS AND METHODS FOR STORAGE MEDIUM MANAGEMENT

CROSS-REFERENCE TO RELATED APPLICATIONS

This application is a continuation of International Patent Application No. PCT/CN2019/114345, filed on Oct. 30, 2019, which claims priority of Chinese Patent Application No. 201811299939.7, filed on Nov. 2, 2018, the contents of which are incorporated entirely herein by reference.

TECHNICAL FIELD

This disclosure generally relates to data storage, and more particularly, relates to a method for defragmenting files stored in a storage medium.

BACKGROUND

In the storage device, a file may be stored in a number of storage units, separately. In this case, a file may include a plurality of data fragments. Thus, when the storage device reads and/or writes multiple data fragments of a file, a data reading component of a storage medium of the storage device (e.g., a magnetic head of a hard disk) may need to move from a first track where a start position of the data reading component is located to a second track where a start of a first data fragment is located, then move from a third track where an end of the first data fragment is located to a fourth track where a start of a second data fragment is located, and so on, until all data fragments of the file is read. Compared to reading and/or writing a file stored in continuous storage units in the storage medium, reading and/or writing a file including a plurality of data fragment increases the number of track seeking, thus, the storage device has to spend a longer time reading and/or writing, thereby reducing the performance of the storage device. Usually, it is necessary to perform a defragmentation on a file with multiple data fragments, i.e., to transfer data fragments to a storage region with a number of continuous storage units so as to improve the reading/writing capability of the storage device.

At present, a commonly used method for defragmentation includes scanning all files in the storage medium. If a file has two or more data fragments, the storage device will transfer data fragments to a storage region with a number of continuous storage units. Due to the limitation of storage capacity of the storage medium, in the process of storing the file, a plurality of data fragments may be generated when a file is written into the storage medium. In this case, each file in the storage medium may need to be defragmented, which leads to a waste of resources. The resources include processor resources and input/output (I/O) interface, etc. The above mentioned method affects reading and/or writing efficiency of the storage device. Thus, it is desirable to develop a system and method for defragmenting files in a storage medium with a higher efficiency.

SUMMARY

According to a first aspect of the present disclosure, a system is provided. The system may comprises at least one storage medium storing files and a set of instructions, and at least one processor configured to communicate with the at least one storage medium for managing the files. When executing the set of instructions, the system is directed to perform operations including obtaining file information of a file stored in the storage medium, wherein the file includes at least two data fragments, each two of the at least two data fragments are stored separately in two discontinuous storage units in the storage medium; determining a first parameter of the file according to the file information, wherein the first parameter represents an integrity of the at least two data fragments in the storage medium; determining whether the first parameter is equal to or smaller than a preset threshold; and defragmenting the at least two data fragments in the storage medium if the first parameter is equal to or smaller than the preset threshold.

According to a second aspect of the present disclosure, a method is provided. The method may be implemented on a storage management device having a storage medium storing files and a set of instructions and at least one processor executing the set of instructions for managing the files stored in the storage medium. The method may comprises obtaining file information of a file stored in the storage medium, wherein the file includes at least two data fragments, each two of the at least two data fragments are stored separately in two discontinuous storage units in the storage medium; determining a first parameter of the file according to the file information, wherein the first parameter represents an integrity of the at least two data fragments in the storage medium; determining whether the first parameter is equal to or smaller than a preset threshold; and defragmenting the at least two data fragments in the storage medium if the first parameter is equal to or smaller than the preset threshold.

According to a third aspect of the present disclosure, a non-transitory computer readable medium is provided. The non-transitory computer readable medium may comprises executable instructions that, when executed by at least one processor, directs the at least one processor to perform operations comprising obtaining file information of a file stored in the storage medium, wherein the file includes at least two data fragments, each two of the at least two data fragments are stored separately in two discontinuous storage units in the storage medium; determining a first parameter of the file according to the file information, wherein the first parameter represents an integrity of the at least two data fragments in the storage medium; determining whether the first parameter is equal to or smaller than a preset threshold; and defragmenting the at least two data fragments in the storage medium if the first parameter is equal to or smaller than the preset threshold.

In some embodiments, the file information includes a number of storage units in the storage medium for storing the at least two data fragments.

In some embodiments, the storage medium is a single disk or a disk array.

In some embodiments, the determining the first parameter of the file according to the file information includes If the storage medium is a single disk, determining a first type of data fragments in the file according to the file information, wherein the number of the storage units that each of the first type of data fragments occupies being integer multiple of a first preset value; determining a first ratio of the number of the first type of data fragments to a total number of the at least two data fragments; and designating the first ratio as the first parameter of the file.

In some embodiments, the determining the first parameter of the file according to the file information includes If the storage medium is a disk array, determining a second type of data fragments and a third type of data fragments in the file according to the file information, wherein the number of the storage units that each of the second type of data fragments occupies being an integer multiple of a second preset value and a start position and an end position of the each of second type of data fragments are aligned to a stripe width of the storage medium, and the number of the storage units that each of the third data fragments occupies being an integer multiple of a second preset value and at least one of a start position or an end position of the each of the second type of data fragments are unaligned to a stripe width of the storage medium; determining a second ratio of the number of the second type of data fragments and the third type of data fragments to a total number of the at least two data fragments; and designating the second ratio as the first parameter of the file.

In some embodiments, the defragmenting the at least two data fragments in the storage medium if the first parameter is equal or smaller than the preset threshold includes writing at least one data fragment of the at least two data fragments into a storage area with continuous storage units in the storage medium at a first writing speed.

In some embodiments, the first writing speed is smaller than a second writing speed, the second writing speed is preset by a user.

In some embodiments, the first writing speed is determined by obtaining a second parameter of the storage management device, wherein the second parameter relates to a processing capability of the storage management device; and adjusting the first writing speed based on the second parameter of the storage device.

In some embodiments, the second parameter is determined based on at least one of a processor utilization rate, a processor idle rate, an I/O utilization rate, or an I/O waiting rate.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of embodiments. These example embodiments are described in detail with reference to the drawings. The drawings are not to scale. These embodiments are non-limiting example embodiments, in which like reference numerals represent similar structures throughout the several views of the drawings, and wherein:

FIG. 4 illustrates an exemplary process for defragmenting files in a storage medium according to some embodiments of the present disclosure;

DETAILED DESCRIPTION

Figure 1:
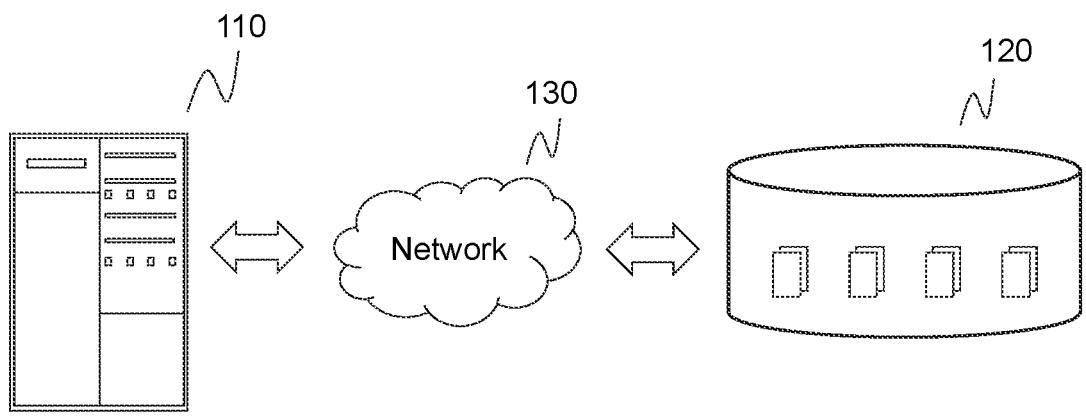
FIG. 1 is a schematic diagram illustrating an exemplary storage management system according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

As used in the disclosure and the appended claims, the singular forms "a," "an," and "the" include plural referents unless the content clearly dictates otherwise. It will be further understood that the terms "comprises," "comprising," "includes," and/or "including" when used in the disclosure, specify the presence of stated steps and elements, but do not preclude the presence or addition of one or more other steps and elements.

Some modules of the system may be referred to in various ways according to some embodiments of the present disclosure, however, any number of different modules may be used and operated in a client terminal and/or a server. These modules are intended to be illustrative, not intended to limit the scope of the present disclosure. Different modules may be used in different aspects of the system and method.

According to some embodiments of the present disclosure, flow charts are used to illustrate the operations performed by the system. It is to be expressly understood, the operations above or below may or may not be implemented in order. Conversely, the operations may be performed in inverted order, or simultaneously. Besides, one or more other operations may be added to the flowcharts, or one or more operations may be omitted from the flowchart.

Technical solutions of the embodiments of the present disclosure be described with reference to the drawings as described below. It is obvious that the described embodiments are not exhaustive and are not limiting. Other embodiments obtained, based on the embodiments set forth in the present disclosure, by those with ordinary skill in the art without any creative works are within the scope of the present disclosure.

In one aspect, the present disclosure is directed to a device and method for storage management. The system may obtain file information of a file including a plurality of data fragments. A first parameter representing an integrity of the file may be determined based on the file information. If the first parameter is smaller than a preset threshold, which may indicate the data fragments has a low continuity, the file may be defragmented.

FIG. 1 is a schematic diagram illustrating an exemplary storage management system according to some embodiments of the present disclosure. The storage management system 100 may be configured to manage files stored in a storage medium. As shown, the storage management system 100 may include a management device 110 and a storage medium 120. In some embodiments, the management device 110 may connect with the storage medium 120 through a network 130.

The management device 110 may process data and/or information related to the storage medium 120 or an external data source (e.g., a cloud data center). The management device 110 may communicate with the storage medium 120 to provide various functionality of data management, for example, defragmentation, data recovery, etc. In some embodiments, the management device 110 may perform main functions of the storage management system 100. In some embodiments, the management device 110 may obtain information of files stored in the storage medium 120, and determine a parameter representing an integrity of a file stored in forms of data fragments in the storage medium 120. In some embodiments, the management device 110 may perform other functions related to the method and system described in the present disclosure.

In some embodiments, the management device 110 may include one or more processing units (e.g., single-core processing device(s) or multi-core processing device(s)). Merely by way of example, the management device 110 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The storage medium 120 may be a device for storing data, instructions, and/or any other information. In some embodiments, the storage medium 120 may store data obtained from a data source (e.g., a cloud data center, a terminal device, a computing device, a data acquisition device, etc.). For example, the storage medium 120 may store a plurality of videos. In some embodiments, the storage medium 120 may store data and/or instructions that the managing device 110 may execute or use to perform exemplary methods described in the present disclosure.

In some embodiments, the data may be stored in forms of files. A file may be a picture, a video, a text file, a computer program, an application, or the like, or any combination thereof. The storage medium 120 may include a mass storage device, a removable storage device, a volatile read-and-write memory, a read-only memory (ROM), or the like, or any combination thereof. Example mass storage may include a magnetic disk, an optical disk, a solid-state drive, etc. Example removable storage may include a flash drive, a floppy disk, an optical disk, a memory card, a zip disk, a magnetic tape, etc. Example volatile read-and-write memory may include a random-access memory (RAM), such as a dynamic RAM (DRAM), a double date rate synchronous dynamic RAM (DDR SDRAM), a static RAM (SRAM), a thyristor RAM (T-RAM), and a zero-capacitor RAM (Z-RAM). Example ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc.

In some embodiments, the management device 110 may be a remote device relative to the storage medium 120 that connects to the storage medium 120 over the network 130. In some embodiments, the management device 110 may be a local device relative to the storage medium 120 that is implemented in or assembled together with the storage medium 120.

The network 130 may include any suitable network that can facilitate a communication and/or data transmission between the management device 110 and the storage medium 120. The network 130 may be and/or include a public network (e.g., the Internet), a private network (e.g., a local area network (LAN), a wide area network (WAN)), a wired network (e.g., an Ethernet network), a wireless network (e.g., an 802.11 network, a Wi-Fi network), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 130 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 130 may include one or more network access points. For example, the network 130 may include wired and/or wireless network access points such as base stations and/or internet exchange points through which an instruction provided by the management device 110 may be transmitted to the storage medium 120.

It should be noted that the above description of the storage management system 100 containing the management device 110 and the storage medium 120 is provided for the purposes of illustration, not intended to limit the scope of the present disclosure. For persons having ordinary skills in the art, components contained in the storage management system 100 may be combined in various ways, or connected with other components as sub-systems, and various variations and modifications may be conducted under the teaching of the present disclosure. However, those variations and modifications may not depart the spirit and scope of this disclosure. For example, the storage management system 100 may further include a terminal device for visually interacting with the management device 110 and/or the storage medium 120. All such modifications are within the protection scope of the present disclosure.

Figure 2:
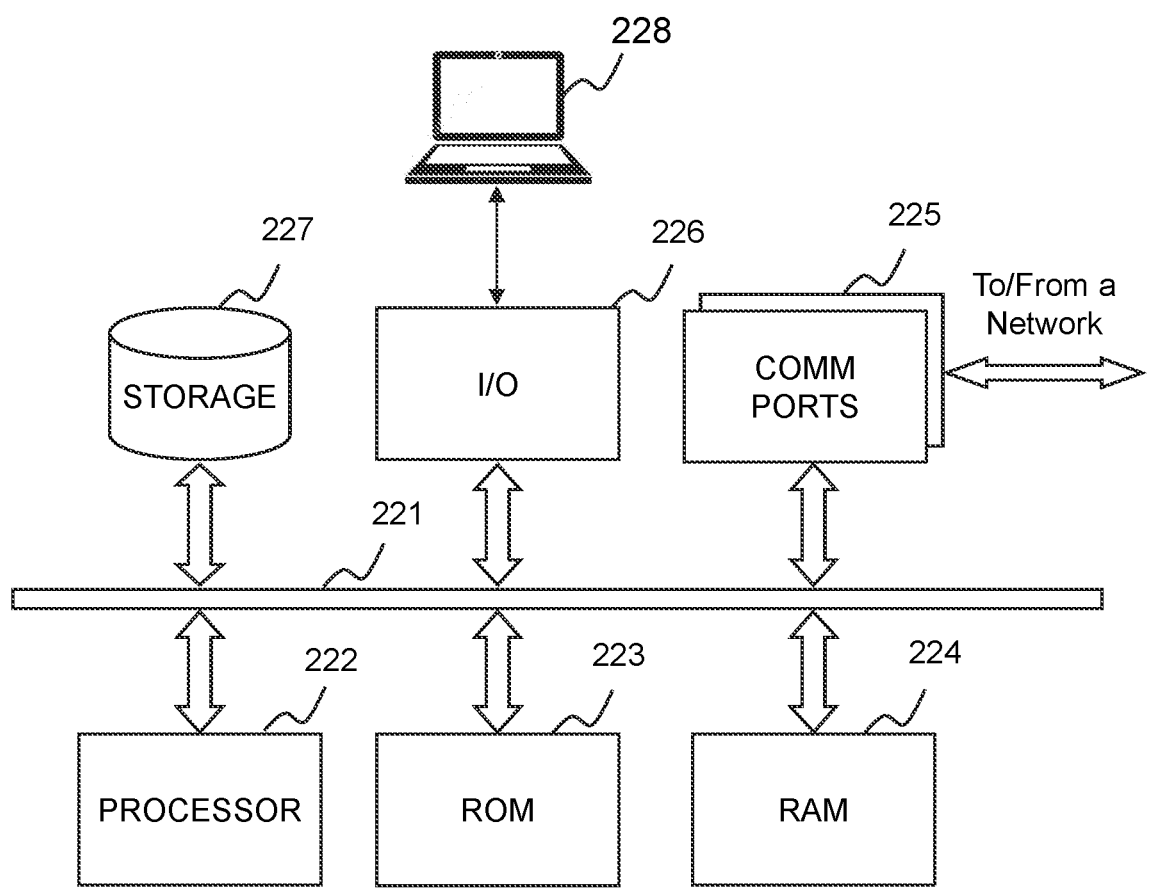
FIG. 2 is a schematic diagram illustrating exemplary hardware and optionally software components of an example computing device according to some embodiments of the present disclosure.

FIG. 2 is a schematic diagram illustrating exemplary hardware and/or software components of an exemplary computing device according to some embodiments of the present disclosure. For example, the computing device 200 may be an implementation of the storage management system 100 including the management device 110 specialized in storage management and the storage medium 120 for storing files. As illustrated in FIG. 2, the computing device 200 may include a processor 222, a storage 227, an input/output (I/O) 226, and a communication port 225.

The processor 222 (e.g., logic circuits) may execute computer instructions (e.g., program code) and perform functions in accordance with techniques described herein. For example, the processor 222 may include interface circuits and processing circuits therein. The interface circuits may be configured to receive electronic signals from a bus (not shown in FIG. 2), wherein the electronic signals encode structured data and/or instructions for the processing circuits to process. The processing circuits may conduct logical operations calculations, and then determine a conclusion, a result, and/or an instruction encoded as electronic signals. Then the interface circuits may send out the electronic signals from the processing circuits via the bus.

The computer instructions may include, for example, routines, programs, objects, components, data structures, procedures, modules, and functions, which perform particular functions described herein. In some embodiments, the processor 222 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two or more different processors jointly or separately in the computing device 200 (e.g., a first processor executes step A and a second processor executes step B, or the first and second processors jointly execute steps A and B).

The storage 227 may store data/information. In some embodiments, the storage 222 may include a mass storage, removable storage, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random-access memory (RAM), which may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 222 may store one or more programs and/or instructions to perform exemplary methods described in the present disclosure. For example, the storage 222 may store a program for the processing engine (e.g., the management device 110) for defragmenting files in the storage medium 120.

The I/O 226 may input and/or output signals, data, information, etc. In some embodiments, the I/O 226 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 225 may be connected to a network (e.g., the network 130) to facilitate data communications. The communication port 225 may establish connections the management device 110 and the storage medium 120, and/or any other component of the storage management system 100. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G), or the like, or a combination thereof. In some embodiments, the communication port 2400 may be and/or include a standardized communication port, such as RS232, RS485, etc. In some embodiments, the communication port 225 may be a specially designed communication port.

Figure 3:
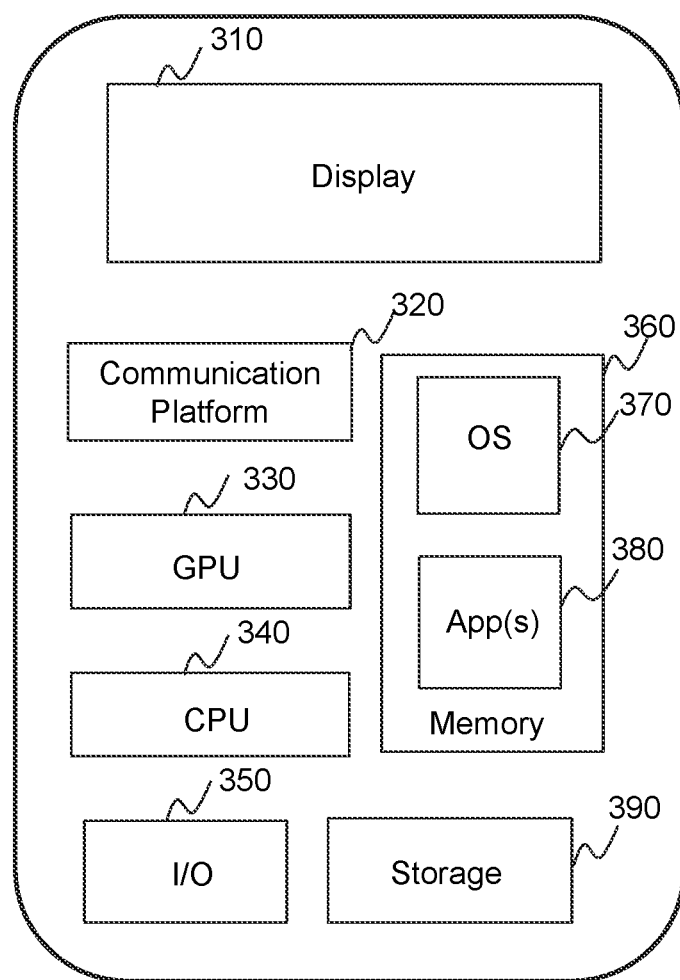
FIG. 3 is a schematic diagram illustrating exemplary components of an example mobile device according to some embodiments of the present disclosure.

FIG. 3 is a schematic diagram illustrating exemplary components of an exemplary user device according to some embodiments of the present disclosure. As illustrated in FIG. 3, the mobile device 300 may include a communication platform 320, a display 310, a graphic processing unit (GPU) 330, a central processing unit (CPU) 330, an I/O port 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage 390 in order to be executed by the processor 340. The mobile device 300 may be an embodiment of management device 110 and the storage medium 120. The applications 380 may include a storage manager for managing data stored in the mobile device 300.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

FIG. 4 is a flow chart illustrating an exemplary process for defragmenting files in a storage medium according to some embodiments of the present disclosure. In some embodiments, the process 400 shown in FIG. 4 may be implemented in the storage management system 100 illustrated in FIG. 1. For example, at least a part of the process 400 may be stored in a storage (e.g., the storage medium 120) as a form of instructions, and invoked and/or executed by the management device 110 (e.g., the processor 222 of the computing device 200 or one or more modules illustrated in FIG. 8). In some embodiments, a part of the process 400 may be implemented on a terminal device. The operations of the illustrated process 400 presented below are intended to be illustrative. In some embodiments, the process 400 may be accomplished with one or more additional operations not described, and/or without one or more of the operations discussed. Additionally, the order in which the operations of the process 400 as illustrated in FIG. 4 and described below is not intended to be limiting.

The storage management system 100 may be implemented by a processor and a storage medium. The processor may facilitate storage management as the management device 110, and the storage medium may function as the storage medium 120. A communication connection may be built between the processor and the storage medium. The communication connection may be a mechanical connection or not. The processor herein refers to a device with a general purpose that reads and/or writes data in a storage medium, such as a central processing unit (CPU). The storage medium herein refers to a device for storing data, such as a magnetic disk or a hard disk. The magnetic disk may be a single disk and a disk array (redundant arrays of independent disks, RAID). The storage management system 100 may be implemented by a storage medium containing a processor. In another word, the storage medium may include a processing chip, which may implement a processor for reading and/or writing data in the storage medium. In some embodiments, the storage management system 100 may be implemented by a software module installed in a terminal device, such as a personal computer (PC), the mobile device 300. Specific types of the storage management system 100 may not be limited.

The storage medium may include a plurality of storage units. The storage management system 100 may read data from and/or write data into the storage units of the storage medium. In another word, a storage unit may be a smallest region in the storage medium for data storage. The storage medium may include a plurality of storage units being numbered consecutively, and a storage space of the storage medium may be a sum of storage spaces of all the storage units. For example, for a magnetic disk under a Linux operating system, the storage units of the magnetic disk may be filesystem blocks. The filesystem blocks may have sizes of K consecutive areas of fan-shapes. K may have any value, for example, 4, 8, or 16, etc. As another example, for a magnetic disk under a Windows operating system, the storage units of the magnetic disk may be clusters. The clusters may have sizes of L consecutive areas of fan-shapes. L may have any value, for example, 4, 8, or 16, etc. Merely by ways of example, a storage unit of a hard disk may be an area of a fan-shape. Specific types and sizes of the storage unit may not be limited.

The storage management system 100 may store a plurality of files, and the size of each file of the plurality of files may exceed a maximum transmission capacity of the storage medium. The storage management system 100 may split each file into a plurality of file blocks, and the plurality of blocks may be stored in the storage medium. Since the storage management system 100 may store the plurality of file blocks of each file at a same time, the file blocks of each of the plurality of files may be stored in one or more discontinuous storage regions of the storage medium. In some embodiments, when a user is intended to delete a file in the storage medium, a part of data in the file may not be cleared, which may be left in the storage medium. This part of data may be stored discretely in discontinuous storage regions of the storage medium. In another word, remaining storage units in the storage medium that may be used to store new files may not be continuous. When the storage management system 100 stores a first file in the storage medium, the first file may be stored in the discontinuous storage regions in the storage medium.

In brief, when the storage management system 100 stores the first file into the storage medium, the first file may be stored in a number of discontinuous storage units in the storage medium. For example, the first file may be stored in a fan-shaped area 1, a fan-shaped area 3, and a fan-shaped area 6. If the first file is stored in discontinuous storage units of the storage medium, the first file may be divided into a plurality of data fragments. If the first file is stored in discontinuous storage units of the storage medium, the storage management system 100 may need to read the plurality of data fragments of the first file when the first file is retrieved from the storage medium. Since data fragments are scattered in the storage medium, a data reading component of the storage medium (e.g., a magnetic head of a hard disk) may need to move from a first track where a start position of the data reading component is located to a second track where a start of a first data fragment is located, then move from a third track where an end of the first data fragment is located to a fourth track where a start of a second data fragment is located, and so on, until all data fragments of the first file is read. Compared to reading and/or writing a file stored in continuous storage units in the storage medium, reading and/or writing a file including a plurality of data fragment increases the number of track seeking, thus, the storage device has to spend a longer time for reading and/or writing, thereby reducing the performance of the storage device. It may be necessary to perform a defragmentation on a file with multiple data fragments, i.e., to transfer data fragments to a storage region with a number of continuous storage units so as to improve the reading/writing capability of the storage device.

A commonly used method for defragmentation may include scanning all files in the storage medium. If a file has two or more data fragments, the storage device may transfer data fragments to a storage region with a number of continuous storage units. Due to the limitation of storage capacity of the storage medium, in the process of storing the file, a plurality of data fragments may be generated when a file is written into the storage medium. In this case, each file in the storage medium may need to be defragmented, which leads to a waste of resources. The resources may include processor resources and input/output (I/O) interface, etc. Thus, the above mentioned method affects reading and/or writing efficiency of the storage device.

In view of the above limitations, the present disclosure may provide a file defragmentation method, which may be implemented by the storage management system 100 so as to reduce impacts of file management on reading and/or writing efficiency of the storage management system 100. In the file defragmentation method, the storage management system 100 may determine a first parameter of a file according to file information, wherein the first parameter represents an integrity of the at least two fragments in the storage medium; and determine whether the first parameter is equal to or smaller than a preset threshold. If the first parameter is equal to or smaller than the preset threshold, the file may be defragmented. In the prior art, a defragmentation may be performed as long as a file has two or more data fragments. The present disclosure may reduce the number of files to be defragmented in the storage medium, which reduces the load of the storage management system 100, thereby reducing impacts of file management on reading and/or writing efficiency of the storage management system 100.

In 410, the management device 110 (or the processor 220 of the computing device) may obtain file information of a file stored in the storage medium, wherein the file includes at least two fragments, and each two of the at least two fragments are stored separately in two storage regions discontinuously distributed in the storage medium. In some embodiments, the file may also be referred to as first file, and the file information of the first file may be referred to as first information. In some embodiments, the file may include N data fragments. The file information may include the N data fragments and storage units occupied by each data fragment of the file in the storage medium. The storage regions composed of storage units occupied by two data fragments may be discontinuous, and N may be an integer greater than or equal to 2.

In some embodiments, a plurality of storage units in the storage medium may be used to store the file. The file may be a video, a picture, a document, etc., which is not limited in the present disclosure.

A plurality of files may be stored in the storage medium. In some embodiments, in order to be convenient for file management, the storage management system 100 may perform file consolidations on a plurality of files according to an order in which the plurality of files are stored in the storage medium. In some embodiments, in order to increase the flexibility of storage management, the storage management system 100 may perform file consolidations on the plurality of files in the storage medium in a random order. If the storage management system 100 performs file consolidations on the plurality of files according to the order in which the plurality of files are stored in the storage medium, the file may be deemed as a file stored in the storage medium at earliest. If the storage management system 100 performs file consolidations on the plurality of files in the storage medium in a random order, the file may be taken as any one of the plurality of files.

Before the storage management system 100 performs file consolidations on the file, the storage management system 100 may need to obtain the file information of the file. The file information may be information of data fragments of the file. In some embodiments, the file information of the file may include N data fragments and the number of storage units occupied by each data fragment of the file in the storage medium. N may be an integer greater than or equal to 2, and storage regions composed of storage units occupied by each two data fragments may be discontinuous. In some embodiments, sizes of all the data fragments of the file may be same. In some embodiments, sizes of a part of data fragments of the file may be the same, and sizes of other data fragments of the file may be different, which is not limited.

In some embodiments, the file information may include other information other than the N data fragments and the number of storage units occupied by each data fragments of the file. Other information may include, for example, a start position of each data fragment in the storage medium and/or an end position of each data fragment in the storage medium. The number of storage units occupied by each data fragment of the file may be understood as a size of each data fragment of the file, or a size of a storage space that each data fragment of the file occupies. A data fragment in the file may occupy an integer number of storage units, or a non-integer number of storage units. For example, if a size of a data fragment A equal to a storage space of one half a storage unit, the data fragment A may occupy one half the storage unit. The size of a data fragment may not be limited.

The storage management system 100 may obtain the file information of the file according to various of methods. For example, the storage management system 100 may obtain the file information by obtaining file information of a file according to a File Allocation Table (FAT) in the storage medium.

To be specific, when the file is stored in the storage medium, the storage management system 100 may record an allocation status of storage units in the storage medium and a table of fore-and-aft link relationships of data fragments in the file. The table may be a file allocation table. Each time the storage management system 100 uses the file information of the file, the content of the file allocation table may be retrieved to obtain the file information of the file. In fact, there may be various ways for the storage management system 100 to obtain the file information of the file, which is not limited.

After operations in 410 are performed, the process 400 may proceed to 420. In 420, the storage management system 100 may determine a first parameter of the file according to the file information and determine whether the first parameter is equal to or smaller than a preset threshold, wherein the first parameter represent an integrity of the at least two fragments in the storage medium.

In existing file defragmentation methods, a storage device may perform file defragmentation as long as a file includes two or more data fragments. The present disclosure may provide a file defragmentation method in which a first parameter of the file may be determined according to file information. If the first parameter of the file is smaller than or equal to a preset threshold, the file may be defragmented. The first parameter may be used to characterize integrity of the storage units where the file is stored in the storage medium. If the integrity of the fragments is relatively high, i.e., storage units storing the file have a high continuity in the storage medium, the storage management system 100 may not need to defragment the file. If the integrity of the fragments is relatively low, i.e., storage units storing the file have a low continuity in the storage medium, the storage management system 100 may need to defragment the file. As used herein, the integrity of the file indicates a degree of continuity of storage units storing the data fragments of the file. The higher the integrity of the file is, the less data fragments that the file will include. In some embodiments, the integrity of the file also indicates a degree of aggregation of positions of storage units storing the data fragments of the file. The first parameter may be determined according to the following methods.

As for a first method, the number of a first type of data fragments in the file may be determined according to the file information. The number of the first type of data segments may also be referred to as first number. The first type of data fragments may be defined according to the number of storage units that each of the first type of fragments occupies. In some embodiments, the first type of data fragments may be defined as the first parameter if the storage medium is a single disk. In some embodiments, the number of the storage units that each of the first type of fragments occupies may be integer multiple of a first preset value. Then a first ratio of the number of the first type of fragments to a total number of all the N fragments may be determined.

In some embodiments, the file information may include N data fragments in the file. Data fragments among the N data fragments that occupy storage units have a number of integer multiple of the first preset value may be the first type of data fragments. The first preset value may refer to a preset number of storage units which may be used by the storage management system 100 to compare the first preset value with the number of storage units occupied by the first type of data fragments. The first preset value may be set by a user manually, or according to default settings of the storage management system 100, etc. The larger the first preset value is, the larger fragments of the first type of data will be, i.e., the better the continuity of the first type of data fragments will be. The number of data fragments of which the number of storage units occupied is an integer multiple of the first preset value may be determined according to the number of storage units occupied by each data fragments among the N data fragments. In another word, after the number of the first type of data fragments in the N data fragments is determined, the storage management system 100 may divide the number of the first type of data fragments by the total number of all data fragments of the file (i.e., N) to determine the first ratio. In some embodiments, the first ratio may be the first parameter.

In the N data fragments of the file, the number of the first type of data fragments may be large or small. If the number of the first type of data fragments is small, the first method may be suitable to be used to obtain the first ratio. If the number of first type of data fragments is relatively large, the operation for obtaining the number of the first type of data fragments may need a large amount of computation of the storage management system 100, thus another method for obtaining the first ratio may be provided below so as to reduce the amount of computation of the storage management system 100.

In some embodiments, the number of a fourth type of data fragments among the N data fragments of the file may be determined according to the file information. The number of the fourth type of data fragments may also be referred to as a fourth number. The fourth type of data fragments may be defined according to the number of storage units occupied by a data fragment. In some embodiments, the number of storage units occupied by a fourth type of data fragment may not be an integer multiple of the first preset value. A third ratio may be obtained according to the ratio of the number of the fourth type of data fragments to the total number of data fragments of the file (i.e., N). The first ratio may be obtained using the third ratio. For example, the first ratio may be obtained by subtracting the third ratio from 1.

The fourth type of data fragments may be data fragments of which the number of storage units that each fourth type of data fragments occupies is not an integer multiple of the first preset value. In some embodiments, the number of the fourth type of data fragments may be determined, and the number of the fourth type of data fragments may be divided by the total number of N data fragments to determine the third ratio. The first ratio may be obtained by subtracting the third ratio from 1. When the first ratio is smaller than or equal to a preset threshold, the file may be defragmented. In some embodiments, the storage management system 100 may randomly select, from various methods including the two methods described above, a method to obtain the first ratio. In some embodiments, the storage management system 100 may select a method to obtain the first ratio according to default settings. The method in which the first ratio is determined may not be limited in the present disclosure.

In some embodiments, the storage management system 100 may obtain a ratio of the number of data fragments with better continuity in the file to a total number of data fragments in the file. The file may be defragmented when the ratio is smaller than or equal to the preset threshold. On the one hand, it may reduce the number of files that the storage management system 100 needs to defragment, thereby saving resources for defragmentation and reducing impacts on normal reading and writing of the storage medium. On the other hand, the preset threshold may be adjusted flexibly so as to control a fragmentation rate of files in the storage medium. For example, the smaller the preset threshold is set to be, the smaller the fragmentation rate of the storage medium will be. The fragmentation rate may be an overall integrity of the storage of the file in the storage medium.

Figure 5:
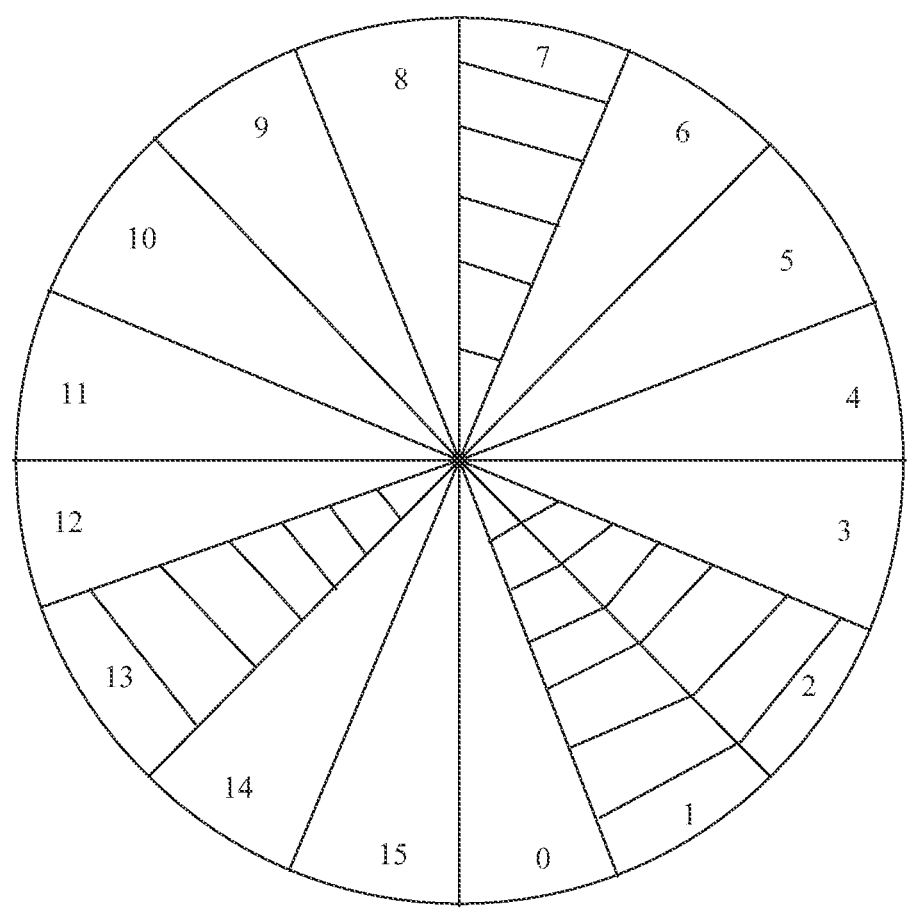
FIG. 5 is a schematic diagram of a single disk storing one or more data fragments of a file according to some embodiments of the present disclosure.

Taking a single disk under a Linux operating system as an example, referring to FIG. 5, a single disk may be divided into 16 storage units, and the 16 storage units may be regions marked by 0 to 15. The size of a file may equal to a storage space of 4 storage units, and the file may include 3 data fragments. The 3 data fragments may include a first data fragment, a second data fragment, and a third data fragment. The storage management system 100 may determine, according to the file information, that the first data fragment occupies a storage unit 13, the second data fragment occupies storage units 1 and 2, and the third data fragment may occupies a storage unit 7. The first preset value may be 2, i.e., the preset number of consecutive storage units may be 2. The number of the storage unit occupied by only the second data fragment may be an integer multiple of the first preset value, and the storage management system 100 may determine that the number of the first type of data fragments in the file is 1, and the first ratio of the file may be ⅓. Merely by ways of example, if the preset threshold is 0.5, the storage management system 100 may determine that the first ratio of the file may be smaller than the preset threshold, and the storage management system 100 may needs to defragment the file. As another example, the storage management system 100 may determine that there are two data fragments of the fourth type among the three data fragments in the file, i.e., the first data fragment and the third data fragment. The third ratio may be ⅔, and the first ratio may be obtained according to the third ratio, i.e., (1−⅔)=⅓.

If the storage medium is a single disk, the more the number of consecutive storage units occupied by each data fragment is, the better the continuity of the data fragment in the file will be. The more the number of data fragments with better continuity, the more centralized the position of storage regions storing data fragments of the file will be. Therefore, the first method may be applicable to the case that the storage medium is a single disk.

If the storage medium is a RAID, when data fragments of full stripes are read and written, the data fragments may be read and written by all subdisks of the RAID. When data fragments of partial strips are read and written, only subdisks storing the data fragments may perform read and write operations. When data fragments of partial stripes are written into the RAID, it is necessary to fill the strips with missing part read from subdisks of the RAID and the data fragments of partial stripes, and calculate a verification value. The data fragments of partial stripes and the verification value may be written into corresponding subdisks of the RAID. The verification value may be used to recover data from other valid subdisks when a subdisk of the RAID has a failure. In comparison with writing data fragments of partial stripes into the RAID, a verification value of data fragments of full stripes may be written into a verification disk directly without reading from subdisks of the RAID when the data fragments of full stripes are written into the RAID. Therefore, the data fragments of full stripes written into the RAID may avoid additional performance cost due to the reading of the missing part when the verification value is calculated, and show a concurrent reading and writing performance of the RAID. As used herein, the subdisks herein refer to disks included in the disk array. In this case, the present disclosure may provide a second method for determining the first parameter of the file, which may be more suitable for the case that the storage medium is a RAID.

As for the second method, the number of a second type of data fragments and the number of a third type of data fragments may be determined according to the file information. The number of the second type of data fragments may also be referred to as second number, and the number of the third type of data fragments may also be referred to as third number. The number of the storage units that each of the second type of data fragments occupies may be an integer multiple of a second preset value, and a start position and an end position of each of the second type of data fragments may be aligned to a stripe width of the storage medium. The number of the storage units that each of the third type of data fragments occupies may be an integer multiple of a second preset value, and a start position and/or an end position of each of the third type of data fragments may be unaligned to a stripe width of the storage medium. Then a second ratio may be obtained based on the second number (i.e., the number of the second type of data fragments), the third number (i.e., the number of the third type of data fragments), and the total number of data fragments in the file (i.e., N data fragments).

In some embodiments, the second preset value may be similar to or the same as the first preset value. The second preset value may be set by a user manually, or according to default settings of the storage management system 100, etc. Data fragments of which the number of the storage units that each of the data fragments occupies may be an integer multiple of the second preset value and a start position and an end position of each of the data fragments may be aligned to the stripe width of the storage medium may be defined as the second type of data fragments of the file. Data fragments of which the number of the storage units that each of the data fragments occupies may be an integer multiple of the second preset value and a start position and/or an end position of each of the data fragments may be unaligned to the stripe width of the storage medium may be defined as the third type of data fragments of the file. The stripe width of the storage medium refers to a sum of storage units in the storage medium that may be read and written concurrently. The storage medium herein may be, for example, a RAID. The stripe width of the RAID may be a sum of storage units that may be read and written concurrently in all subdisks of the RAID. The stripe width may be the size of a stripe. A stripe may relate to regions of same locations in all subdisks corresponding to a unit that can be read and written in RAID. The stripe width may not be limited in the present disclosure. For example, the stripe width may be equivalent to a storage capacity of 3 storage units. In some embodiments, the stripe width may be represented by the number of storage units directly so as to simplify the calculations. As described above, the storage medium may include a plurality of storage units that are numbered consecutively from 0. A data fragment may occupy one or more storage units. The start position of the data fragment refers to a storage unit from which the data fragment is started to be stored in the storage medium. The end position of the data fragment refers to a storage unit where the data fragment terminates in the storage medium. A start position of a data fragment being aligned to the stripe width of the storage medium may refer that the numbering of a storage unit where the start position of the data fragment is located can be divisible by the stripe width of the storage medium. An end position of a data fragment being aligned to the stripe width of the storage medium may refer that a sum of 1 and the numbering of a storage unit where the end position of the data fragment is located can be divisible by the stripe width of the storage medium. A start position of a data fragment being unaligned to the stripe width of the storage medium may refer that the numbering of a storage unit where the start position of the data fragment is located can not be divisible by the stripe width of the storage medium. An end position of a data fragment being unaligned to the stripe width of the storage medium may refer that a sum of 1 and the numbering of a storage unit where the end position of the data fragment is located can not be divisible by the stripe width of the storage medium.

In summary, after the storage management system 100 obtains the number of the second type of data fragments and the number of the third type of data fragments in the file according to the file information, the second ratio may be determined according to the second number, the third number, and a total number of data fragments in the file. The second ratio may be an implementation of the second method characterizing the first parameter. When the second ratio is smaller than or equal to the preset threshold, the storage management system 100 may need to defragment the file. In some embodiments, the storage management system 100 may determine the second ratio using various of methods, which is not limited in the present disclosure.

In the disk array, sizes of the second type of data fragments and the third type of data fragments may satisfy the second preset value, and the second type of data fragments and the third type of data fragments may not have a large impact on a data reading and/or writing process of the RAID. Therefore, if the second type of data fragments and the third type of data fragments in the file constitute a majority of all data fragments in the file, it may indicate that the time spent for reading the file may be relatively short, such that the storage management system 100 may not need to defragment the file, thereby avoiding excessive defragmentation which affects normal reading and/or writing of files in the storage medium.

Merely for illustration purposes, the storage management system 100 may obtain the second ratio T according to the second number, the third number, and the number of all data fragments N, which may be expressed in Formula (1):

$$T = \frac{(H2*P1 + H3*P2)}{N}, \quad (1)$$

where H2 denotes the second number, H3 denote the third number, P1 denotes a first weight of the second number, and P2 denotes a second weight of the third number. P1 and/or P2 may be manually set by the user, according to default settings of the storage management system 100, etc. In some embodiments, P1+P2=1.

If the second type of data fragments and the third type of data fragments constitute a minority of the data fragments in the file, it may be suitable to use the second method as described above so as to obtain the second ratio. However, if the second type of data fragments and the third type of data fragments constitute a majority of the data fragments in the file, it is obvious that the storage management system 100 may have a large amount of computation to determine the second number and the third number.

Therefore, another method of determining the second ratio may be provided below so as to reduce the amount of computation of the storage management system 100.

The number of a fifth type of data fragments may be determined according to the file information. The number of the fifth type of data fragments may also be referred to as fifth number. In some embodiments, the fifth type of data fragments may be data fragments in the file stored in the RAID other than the third type of data fragments and the fourth type of data fragments. The number of the storage units occupied by each of the fifth type of data fragments may not be an integer multiple of the second preset value. The second ratio may be obtained based on the fifth number and the total number of data fragments in the file.

In some embodiments, if the number of storage units occupied by a data fragment of the file is not equal to an integer multiple of the second preset value, the data fragment may be a data fragment of the fifth type. After the storage management system 100 obtains the number of the fifth type of data fragments (i.e., the fifth number) in the file according to the file information, a fourth ratio may be determined according to the fifth number and the total number of data fragments in the file. The second ratio may be determined by subtracting the fourth ratio from 1. Similarly, if the second ratio is smaller than or equal to the preset threshold, the storage management system 100 may need to defragment the file. The second ratio obtained by the second method may also be used to represent the integrity of the file in the storage medium, but the value of the second ratio may be not necessarily the same as the value of the second ratio determined using other methods.

Figure 6:
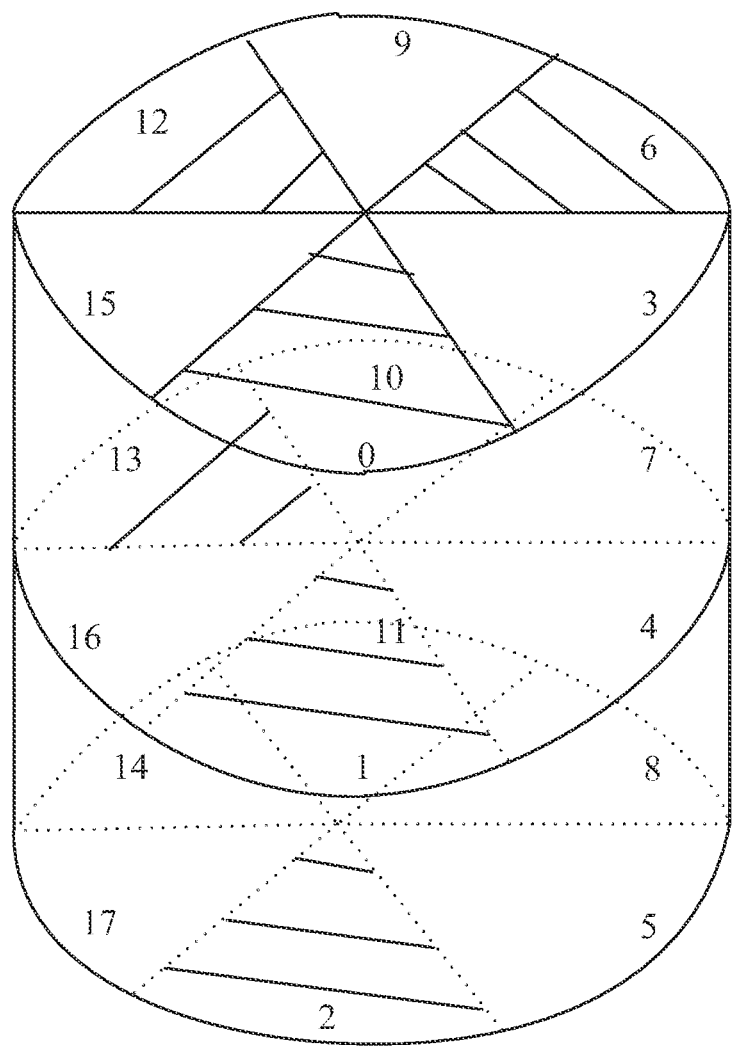
FIG. 6 is a schematic diagram of a disk array storing one or more data fragments of a file according to some embodiments of the present disclosure.

Merely by ways of example, the storage medium may be a disk array (i.e., RAID). Refer to FIG. 6, the disk array may include 18 storage units, which are consecutively numbered from 0 to 17. The second preset value may be 3, and the stripe width of the disk array may be 3. The file may be stored on storage units numbered 0, 1, 2, 12, 13, and 6 of the disk array. The storage management system 100 may determine that the file includes three data fragments including a first data fragment, a second data fragment, and a third data fragment. The first data fragment may be stored in storage units numbered from 0 to 2, the second data fragments may be stored in storage units numbered 12 and 13, and the third data fragment may be stored in a storage unit numbered 6. The storage management system 100 may determine a start position of the first data fragment as the storage unit numbered 0, an ending position of the first data fragment as the storage unit numbered 2, a start position of the second data fragment as the storage unit numbered 12, an ending position of the second data fragment as the storage unit numbered 13, a start position of the third data fragment as the storage unit numbered 6, and an ending position of the third data fragment as the storage unit numbered 6. The storage management system 100 may determine that the first data fragment occupies three storage units, which is an integer multiple of the second preset value. And the start position and the end position of the first data fragment may be aligned with the stripe width of the disk array. The storage management system 100 may determine the first data fragment as a first type of data fragment. Merely by ways of example, the value of P1 may be 0.7, and the value of P2 may be 0.3. The second ratio T may be determined as:

$$T = \frac{(1*0.7 + 0*0.3)}{3} = 0.23$$

If the preset threshold is 0.5, the value of the second ratio of the file 0.23 is smaller than 0.5, and the storage management system 100 may need to defragment the file.

Alternatively, the storage management system 100 may determine that the second data fragment and the third data fragment belong to the fifth type of data fragments, and the second ratio T may be determined as:

$$T = 1 - \frac{2}{3} = 0.33$$

In some embodiments, the storage management system 100 may defragment the file directly after the storage management system 100 determines that the file needs to be defragmented. In some embodiments, after the storage management system 100 determines that the file needs to be defragmented, the storage management system 100 may continue to check whether other files in the storage medium need to be defragmented in a same way. After all the files in the storage medium are checked, the storage management system 100 may defragment files need to be defragmented.

After operations in 420 are performed, the process 400 may proceed to 430. In 430, if the value of the first parameter is smaller than or equal to the preset threshold, the storage management system 100 may defragment the data frames of the file in the storage medium.

In some embodiments, the storage management system 100 may defragment the file by writing one or more data fragments of the N data fragments of the file into continuous storage units of the storage medium. For example, M data fragments in the file may be transferred to continuous storage units of the storage medium, and M may be smaller than or equal to N. In some embodiments, when the storage management system 100 consolidates the file, the N data fragments of the file may be written into continuous storage units of the storage medium. In some embodiments, a part of the N data fragments of the file may be written into continuous storage units of the storage medium so as to reduce the load of the storage management system 100. The part of the N data fragments may not be limited in the present disclosure. In this case, the storage management system 100 may need to determine the M data fragments of the file which are written into continuous storage units. In some embodiments, the storage management system 100 may determine the M data fragments using various methods.

For example, as for a first method for determining the M data fragments, the storage management system 100 may determine data fragments in the N data fragments of the file other than the first type of data fragments, the second type of data fragments, and the third type of data fragments described above as the M data fragments. With reference to the above descriptions, the first type of data fragments, the second type of data fragments, and the third type of data fragments may be data fragments occupying a number of continuous storage units. In another word, the first type of data fragments, the second type of data fragments, and the third type of data fragments may be better in continuity. Therefore, the storage management system 100 may designate other data fragments in the file as the M data fragments. According to the first method, the storage management system 100 may defragment the M data fragments with poor continuity directly, which improves the continuity of the file effectively, thereby reducing the fragmentation rate of the storage medium effectively.

As another example, as for a second method for determining the M data fragments, the storage management system 100 may determine data fragments of which the number of storage units occupied by the data fragments smaller than a preset number as the M data fragments. It is possible that a part of the data fragments in the file occupy a relatively large number of storage units. If the storage management system 100 writes the part of the data fragments to continuous storage units of the storage medium, it may take a long time, consume a large amount of resources, and increase the load of processors in the storage management system 100. Therefore, the storage management system 100 may determine a data fragments occupying a relatively small number of storage units as the M data fragments so as to reduce the load of the storage management system 100.

As another example, as for a third method for determining the M data fragments, the storage management system 100 may select one or more data fragments from the N data fragments randomly, and determine the selected one or more data fragments as the M data fragments. The third method herein may be more flexible, but with poorly pertinence.

When the storage management system 100 defragments the data fragments in the file, the M data fragments in the file may be written into a region with continuous storage units in the storage medium at a first defragmenting speed so as to further reduce effects on normal reading and writing efficiency of the storage medium. The first defragmenting speed refers to a maximum amount of data written in the storage medium per unit time when the storage management system 100 focuses on defragmenting data fragments in the file. The first defragmenting speed may also be referred to as a first writing speed. For example, if the first defragmenting speed is 2 Mb/s, it may indicate that the maximum amount of data that can be written into the storage medium in 1 second may be 2 Mb. In another word, when the M data fragments in the file is written into the region with continuous storage units in the storage medium, the load of processors of the storage management system 100 is limited.

In some embodiments, the first defragmenting speed may be determined according to an input of a user. For example, a user may set a second defragmenting speed (also referred to as second writing speed) as a maximum writing speed manually. The first defragmenting speed may be smaller than the second defragmenting speed. In some embodiments, the first defragmenting speed may also be determined according to the load of the processors (e.g., the processor 222, the CPU 340, etc.) of the storage management system 100. The load of the processors of the storage management system 100 may have an upper limit value, and the upper limit value may indicate a maximum amount of data that the processors may read and/or write per unit time (i.e., processing capability of the storage management system 100). If the load of the processors occupied by the file is oversized, it may indicate that the load of the processor for normal reading and/or writing of data in the storage medium may be affected. Therefore, during the defragmentation process, the storage management system 100 may adjust the first defragmenting speed in real-time according to the load of the processors. If the first defragmenting speed is determined according to the processing capability of the storage management system 100, it may be necessary to determine the processing capability of the storage management system 100 at first. The processing capability of the storage management system 100 refers to loads of the processors and the storage medium in the storage management system 100.

In some embodiments, the processing capability of the storage management system 100 may be determined according to a second parameter. The second parameter may include at least one of a processor utilization rate, a processor idle rate, an input/output (I/O) utilization rate, and an I/O waiting rate. The processor utilization rate may be marked as cpu %, and the processor idle rate may be marked as idle %, the I/O utilization rate may be marked as util %, and the I/O may be marked as I/O wait %. Cpu % may represent a percentage of a processing volume of the processors that are occupied in a unit time. The larger the processor utilization rate is, the larger the load of the processors will be. Idle % may represent the time when the processors are not used for data reading and/or writing in a unit time. The smaller the idle time rate of the processors is, the larger the load of the processors will be. Util % may represent the time that the processors read and/or write data in a unit time. The larger the utilization rate of the I/O interfaces, the larger the load of the storage medium. I/O wait % may represent the time that the processors wait for data to be read and written in a unit time. The larger the I/O waiting rate is, the larger the load of the processors and storage medium will be.

When the load of the processor is larger, it may reduce the first defragmenting speed, avoiding the processor load being too large, and affecting the normal reading and writing of the processor processing storage medium. That is to say, the first defragmenting speed may be a dynamic value that is continuously adjusted according to the load of the processor and the load of the storage medium. It is further understood that the maximum value of the first defragmenting speed may be obtained according to the load of the processor and the maximum load of the storage medium. That is to say, when the storage management system 100 is operated at the maximum value of the first defragmenting speed, the load of the processor and the load of the storage medium may not exceed the load of the processor and the maximum load of the storage medium, thereby ensuring the normal operation of the storage management system 100.

Figure 7:
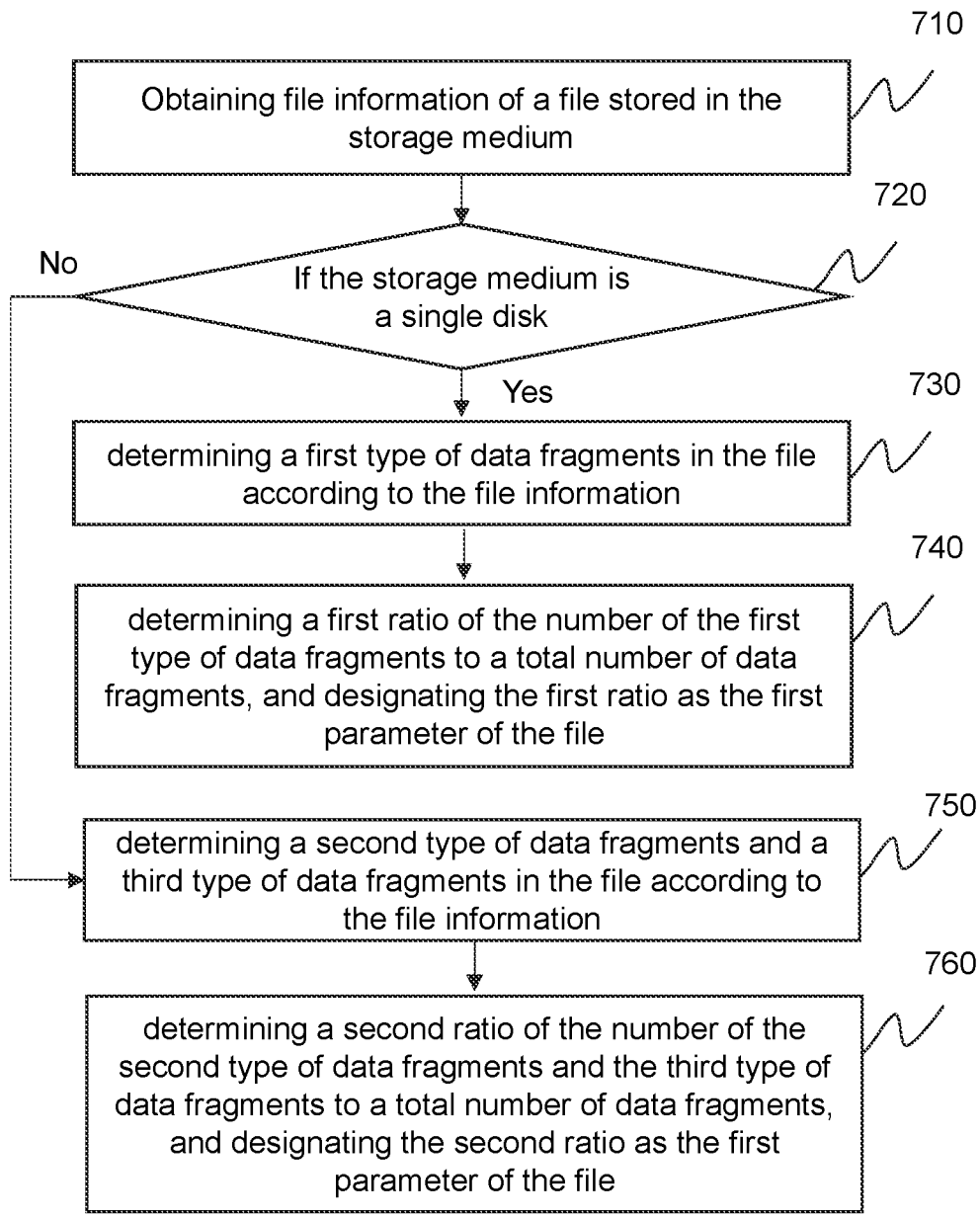
FIG. 7 is a flow chart of an exemplary process for determining a first parameter of a file based on file information of the file according to some embodiments of the present disclosure.

FIG. 7 is a flow chart of an exemplary process for determining a first parameter of a file based on file information of the file according to some embodiments of the present disclosure. In some embodiments, the process 700 shown in FIG. 7 may be implemented in the storage management system 100 illustrated in FIG. 1. In some embodiments, the process 700 may be accomplished with one or more additional operations not described, and/or without one or more of the operations discussed. Additionally, the order in which the operations of the process 700 as illustrated in FIG. 7 and described below is not intended to be limiting.

In 710, the management device 110 (or the processor 222) may obtain file information of a file stored in the storage medium. The file may be a video, a picture, a document, etc., which is not limited in the present disclosure. In some embodiments, a plurality of storage units in the storage medium may be used to store the file. In some embodiments, the file may include N data fragments. The file information may include the N data fragments and storage units occupied by each data fragment of the file in the storage medium. The storage regions composed of storage units occupied by two data fragments may be discontinuous, and N may be an integer greater than or equal to 2. For example, the file may be stored on storage units numbered 0, 1, 2, 12, 13, and 6 of a disk array.

A data fragment in the file may occupy an integer number of storage units, or a non-integer number of storage units. For example, if a size of a data fragment A equals to a storage space of one half a storage unit, the data fragment A may occupy one half the storage unit. The size of a data fragment may not be limited. In some embodiments, the file information may include other information except the N data fragments and the number of storage units occupied by each data fragments of the file. Other information may include, for example, a start position of each data fragment in the storage medium and/or an end position of each data fragment in the storage medium.

In 720, a determination may be made as to whether the storage medium is a single disk. If the storage medium is a single disk, the process 700 may proceed to 730, otherwise, the process 700 may proceed to 750. For example, if the management device 110 (or the processor 222) determines that the storage medium is a RAID, the process 700 may proceed to 750.

In 730, the management device 110 (or the processor 222) may determine a first type of data fragments in the file according to the file information. The first type of data fragments may be defined according to the number of storage units that each of the first type of fragments occupies. In some embodiments, the first type of data fragments may be defined as the first parameter if the storage medium is a single disk. In some embodiments, the number of the storage units that each of the first type of fragments occupies may be integer multiple of a first preset value. In another word, data fragments among the N data fragments that occupy storage units have a number of integer multiple of the first preset value may be the first type of data fragments.

The first preset value may refer to a preset number of storage units which may be used by the storage management system 100 to compare the first preset value with the number of storage units occupied by the first type of data fragments. The first preset value may be set by a user manually, or according to default settings of the storage management system 100, etc.

The storage management system 100 may determine the number of the first type of data fragments in the N data fragments, which may be used to determine the a first ratio in 740.

In 740, the management device 110 (or the processor 222) may determine a first ratio of the number of the first type of data fragments to a total number of data fragments, and designate the first ratio as the first parameter of the file. After the number of the first type of data fragments in the N data fragments is determined, the storage management system 100 may divide the number of the first type of data fragments by the total number of all data fragments of the file (i.e., N) to determine the first ratio. The first ratio may be designated as the first parameter.

In 750, the management device 110 (or the processor 222) may determine a second type of data fragments and a third type of data fragments in the file according to the file information. If the storage medium is a disk array, for example, a RAID, the process 700 may proceed to 750 to determine the second type of data fragments and the third type of data fragments in the file according to the file information.

The number of the storage units that each of the second type of data fragments occupies may be an integer multiple of a second preset value, and a start position and an end position of each of the second type of data fragments may be aligned to a stripe width of the storage medium. The number of the storage units that each of the third type of data fragments occupies may be an integer multiple of a second preset value, and a start position and/or an end position of each of the third type of data fragments may be unaligned to a stripe width of the storage medium. In another word, data fragments of which the number of the storage units that each of the data fragments occupies may be an integer multiple of the second preset value and a start position and an end position of each of the data fragments may be aligned to the stripe width of the storage medium may be defined as the second type of data fragments of the file. And data fragments of which the number of the storage units that each of the data fragments occupies may be an integer multiple of the second preset value and a start position and/or an end position of each of the data fragments may be unaligned to the stripe width of the storage medium may be defined as the third type of data fragments of the file.

The stripe width of the disk array may be a sum of storage units that may be read and written concurrently in all subdisks of the disk array. The stripe width may be the size of a stripe. A stripe may relate to regions of same locations in all subdisks corresponding to a unit that can be read and written in the disk array.

In some embodiments, the second preset value may be similar to or the same as the first preset value. The second preset value may be set by a user manually, or according to default settings of the storage management system 100, etc.

The storage management system 100 may determine the number of the second type of data fragments and the number of the third type of data fragments, which may be used to determine the second ratio.

In 760, the management device 110 (or the processor 222) may determine a second ratio of the number of the second type of data fragments and the third type of data fragments to a total number of data fragments, and designating the second ratio as the first parameter of the file. After the storage management system 100 obtains the number of the second type of data fragments and the number of the third type of data fragments in the file according to the file information, the second ratio may be determined according to the second number, the third number, and a total number of data fragments in the file. In some embodiments, the second ratio may be a ratio of a sum of the second number and the third number to the total number of data fragments in the file. The second ratio may be designated as the first parameter of the file.

Figure 8:
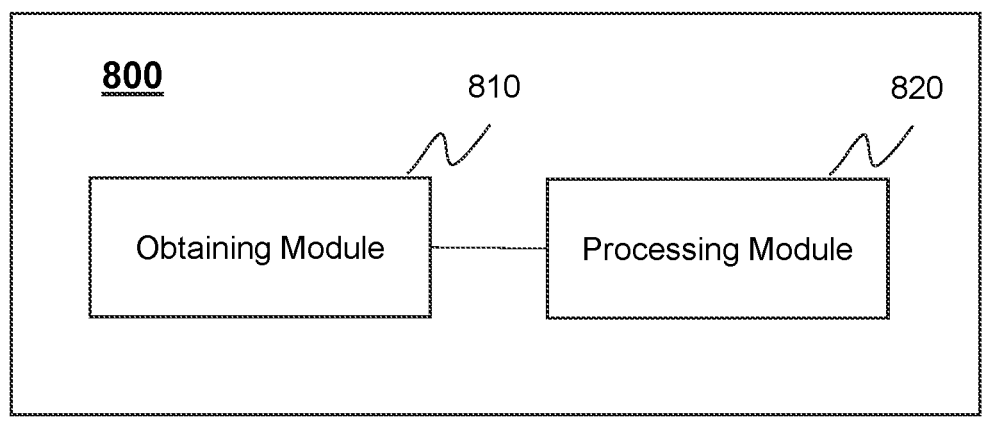
FIG. 8 is a block diagram of a management device of the storage management system 100 according to some embodiments of the present disclosure.

FIG. 8 is a block diagram of the management device of the storage management system 100 according to some embodiments of the present disclosure. The management device 110 may include an obtaining module 401 and a processing module 402. In some embodiments, the obtaining module 401 and the processing module 402 may be implemented by at least one processor in the storage management system 100.

The obtaining module 810 may be configured to obtain file information of a file. In some embodiments, the file may include N data fragments. The file information may include the N data fragments and storage units occupied by each data fragment of the file in the storage medium. The storage regions composed of storage units occupied by two data fragments may be discontinuous, and N may be an integer greater than or equal to 2.

In some embodiments, a plurality of storage units in the storage medium may be used to store the file. The file may be a video, a picture, a document, etc., which is not limited in the present disclosure.

In some embodiments, the file information may include other information except the N data fragments and the number of storage units occupied by each data fragments of the file. Other information may include, for example, a start position of each data fragment in the storage medium and/or an end position of each data fragment in the storage medium. The number of storage units occupied by each data fragment of the file may be understood as a size of each data fragment of the file, or a size of a storage space that each data fragment of the file occupies. A data fragment in the file may occupy an integer number of storage units, or a non-integer number of storage units. For example, if a size of a data fragment A equals to a storage space of one half a storage unit, the data fragment A may occupy one half the storage unit. The size of a data fragment may not be limited.

The processing module 820 may be configured to determine a first parameter of the file according to file information. The first parameter represent an integrity of the at least two fragments in the storage medium. The first parameter may be used to characterize integrity of the storage units where the file is stored in the storage medium. If the integrity of the fragments is relatively high, i.e., storage units storing the file have a high continuity in the storage medium, the storage management system 100 may not need to defragment the file. If the integrity of the fragments is relatively low, i.e., storage units storing the file have a low continuity in the storage medium, the storage management system 100 may need to defragment the file. The integrity of the file indicates a degree of continuity of storage units storing the data fragments of the file. The higher the integrity of the file is, the less data fragments that the file will include. In some embodiments, the integrity of the file also indicates a degree of aggregation of positions of storage units storing the data fragments of the file.

If the value of the first parameter is smaller than or equal to the preset threshold, the storage management system 100 may defragment the data frames of the file in the storage medium.

In some embodiments, the processing module 820 may also be configured to determine if the storage medium is a single disk or a RAID. If the storage medium is a single disk, the number (i.e., the first number) of a first type of data fragments in the file may be determined according to the file information. In some embodiments, the number of the storage units that each of the first type of fragments occupies may be integer multiple of a first preset value. Then a first ratio of the number of the first type of fragments to a total number of all the N fragments may be determined. After the number of the first type of data fragments in the N data fragments is determined, the processing module 100 may divide the number of the first type of data fragments by the total number of all data fragments of the file (i.e., N) to determine the first ratio. In some embodiments, the first ratio may be the first parameter.

If the storage medium is a RAID, the number of a second type of data fragments and the number of a third type of data fragments may be determined according to the file information. The number of the storage units that each of the second type of data fragments occupies may be an integer multiple of a second preset value, and a start position and an end position of each of the second type of data fragments may be aligned to a stripe width of the storage medium. The number of the storage units that each of the third type of data fragments occupies may be an integer multiple of a second preset value, and a start position and/or an end position of each of the third type of data fragments may be unaligned to a stripe width of the storage medium. Then a second ratio may be obtained based on the second number (i.e., the number of the second type of data fragments), the third number (i.e., the number of the third type of data fragments), and the total number of data fragments in the file (i.e., N data fragments).

In some embodiments, the processing module 820 may further be configured to defragment the file by writing one or more data fragments of the N data fragments of the file into continuous storage units of the storage medium. For example, M data fragments in the file may be transferred to continuous storage units of the storage medium, and M may be smaller than or equal to N.

When the processing module 820 defragments the data fragments in the file, the M data fragments in the file may be written into a region with continuous storage units in the storage medium at a first defragmenting speed so as to further reduce effects on normal reading and writing efficiency of the storage medium. The first defragmenting speed refers to a maximum amount of data written in the storage medium per unit time when the processing module 820 focuses on defragmenting data fragments in the file. The first defragmenting speed may also be referred to as a first writing speed.

In some embodiments, the first defragmenting speed may be preset, for example, by a user or the processing module 820 as default settings. In some embodiments, the first defragmenting speed may also be determined according to the load of the processors (e.g., the processor 222, the CPU 340, etc.) of the storage management system 100. The load of the processors of the storage management system 100 may have an upper limit value, and the upper limit value may indicate a maximum amount of data that the processors may read and/or write per unit time (i.e., processing capability of the storage management system 100).

Figure 9:
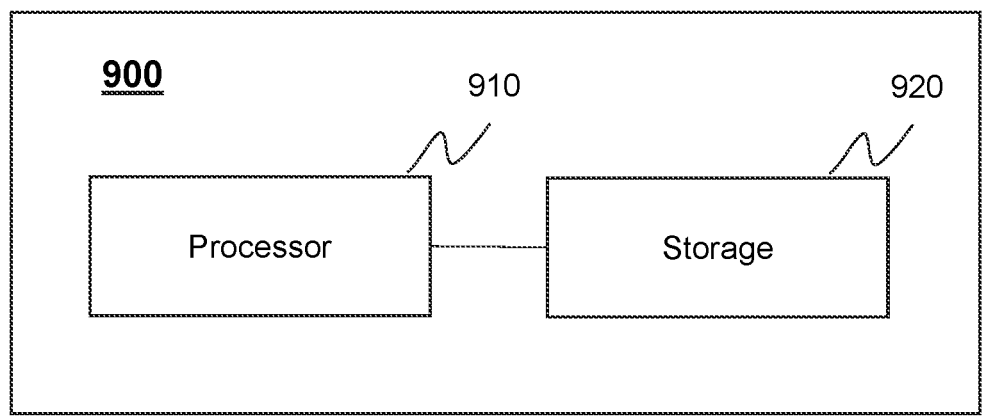
FIG. 9 is a block diagram of the storage management system 100 according to some embodiments of the present disclosure.

FIG. 9 is a block diagram of the storage management system 100 according to some embodiments of the present disclosure. The storage management system 100 may include a processor 910 and a storage 920. The processor 910 may be the management device 110, a part of the management device 110, or a processor in the storage management system 100 as described above. The storage 920 may be the storage medium 120 or a part of the storage medium 120. The processor 910 and the storage 920 may communicate with each other. In some embodiments, the processor 910 and the storage 920 may also be a processor in the storage management system 100 as described above.

In some embodiments, the storage management system 100 may include more than one processor 910 and more than one storage 920. The more than one storage 920 may be communicatively coupled to the more than one processor 910.

The storage 920 may store instructions executable by the processor 910, and exemplary methods (e.g., the methods described in the processes 400 and 700) may be implemented when the processor 910 performs the instructions stored in the storage 920.

In some embodiments, the obtaining module 810 and the processing module 820 shown in FIG. 4 may be implemented by the processor 910 in FIG. 9.

The present disclosure may further provide a computer readable storage medium storing computer instructions for file defragmentation. When the computer instructions are executed by a computing device (e.g., the computing device 200), the computing device may be caused to perform the methods as shown in FIG. 4 and/or FIG. 7.

Those skilled in the art shall understand that the embodiments of the present invention may be provided as a method, a system or a computer program product. Therefore, this application can use the forms of entirely hardware embodiment, entirely software embodiment, or embodiment combining software and hardware. Further, the present invention may also take a form of a computer program product implemented in one or more computer usable storage media (including but not limited to magnetic disc memory, CD-ROM, optical memory, etc.) including a computer usable program code.

It will be apparent to those skilled in the art that various changes and modifications can be made in the present disclosure without departing from the spirit and scope of the disclosure. The present disclosure may be intended to include such modifications and variations if the modifications and variations of the present disclosure are within the scope of the claims and the equivalents thereof.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the example embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in smaller than all features of a single foregoing disclosed embodiment.

What is claimed is:

1. A system, comprising:
   at least one storage medium storing files and a set of instructions; and
   at least one processor configured to communicate with the at least one storage medium for managing the files, wherein when executing the set of instructions, the system is directed to perform operations including:
   obtaining file information of a file stored in the storage medium, wherein the file includes at least two data fragments, each two of the at least two data fragments are stored separately in two discontinuous storage units in the storage medium, wherein the file information includes a number of storage units in the storage medium for storing the at least two data fragments, wherein the storage medium is a single disk or a disk array;
   determining a first parameter of the file according to the file information, wherein the first parameter represents an integrity of the at least two data fragments in the storage medium, wherein the determining the first parameter of the file according to the file information includes:
   if the storage medium is the disk array,
      determining a second type of data fragments and a third type of data fragments in the file according to the file information, wherein the number of the storage units that each of the second type of data fragments occupies is an integer multiple of a second preset value and a start position and an end position of the each of second type of data fragments are aligned to a stripe width of the storage medium, and the number of the storage units that each of the third data fragments occupies is an integer multiple of a second preset value and at least one of a start position or an end position of the each of the second type of data fragments are unaligned to a stripe width of the storage medium;

determining a second ratio of the number of the second type of data fragments and the third type of data fragments to a total number of the at least two data fragments; and designating the second ratio as the first parameter of the file;

determining whether the first parameter is equal to or smaller than a preset threshold; and defragmenting the at least two data fragments in the storage medium if the first parameter is equal to or smaller than the preset threshold.

2. The system of claim 1, wherein the determining the first parameter of the file according to the file information includes:

if the storage medium is the single disk, determining a first type of data fragments in the file according to the file information, wherein the number of the storage units that each of the first type of data fragments occupies is integer multiple of a first preset value;

determining a first ratio of the number of the first type of data fragments to the total number of the at least two data fragments; and designating the first ratio as the first parameter of the file.

3. The system of claim 1, wherein the defragmenting the at least two data fragments in the storage medium if the first parameter is equal or smaller than the preset threshold includes:

writing at least one data fragment of the at least two data fragments into a storage area with continuous storage units in the storage medium at a first writing speed.

4. The system of claim 3, wherein the first writing speed is smaller than a second writing speed, and the second writing speed is preset by a user.

5. The system of claim 3, wherein the first writing speed is determined by:

obtaining a second parameter of the storage management device, wherein the second parameter relates to a processing capability of the storage management device; and adjusting the first writing speed based on the second parameter of the storage device.

6. The system of claim 5, wherein the second parameter is determined based on at least one of a processor utilization rate, a processor idle rate, an I/O utilization rate, or an I/O waiting rate.

7. A method implemented on a storage management device having a storage medium storing files and a set of instructions and at least one processor executing the set of instructions for managing the files stored in the storage medium, the method comprising:

obtaining file information of a file stored in the storage medium, wherein the file includes at least two data fragments, each two of the at least two data fragments are stored separately in two discontinuous storage units in the storage medium, wherein the file information includes a number of storage units in the storage medium for storing the at least two data fragments, wherein the storage medium is a single disk or a disk array;

determining a first parameter of the file according to the file information, wherein the first parameter represents an integrity of the at least two data fragments in the storage medium, wherein the determining the first parameter of the file according to the file information includes:

if the storage medium is the disk array, determining a second type of data fragments and a third type of data fragments in the file according to the file information, wherein the number of the storage units that each of the second type of data fragments occupies is an integer multiple of a second preset value and a start position and an end position of the each of second type of data fragments are aligned to a stripe width of the storage medium, and the number of the storage units that each of the third data fragments occupies is an integer multiple of a second preset value and at least one of a start position or an end position of the each of the second type of data fragments are unaligned to a stripe width of the storage medium;

determining a second ratio of the number of the second type of data fragments and the third type of data fragments to a total number of the at least two data fragments; and designating the second ratio as the first parameter of the file;

determining whether the first parameter is equal to or smaller than a preset threshold; and defragmenting the at least two data fragments in the storage medium if the first parameter is equal to or smaller than the preset threshold.

8. The method of claim 7, wherein the determining the first parameter of the file according to the file information includes:

if the storage medium is the single disk, determining a first type of data fragments in the file according to the file information, wherein the number of the storage units that each of the first type of data fragments occupies is integer multiple of a first preset value;

determining a first ratio of the number of the first type of data fragments to the total number of the at least two data fragments; and designating the first ratio as the first parameter of the file.

9. The method of claim 7, wherein defragmenting the at least two data fragments in the storage medium if the first parameter is equal or smaller than the preset threshold include:

writing at least one data fragment of the at least two data fragments into a storage area with continuous storage units in the storage medium at a first writing speed.

10. The method of claim 9, wherein the first writing speed is smaller than a second writing speed, and the second writing speed is preset by a user.

11. The method of claim 9, wherein the first writing speed is determined by:

obtaining a second parameter of the storage management device, wherein the second parameter relates to a processing capability of the storage management device; and adjusting the first writing speed based on the second parameter of the storage device.

12. The method of claim 11, wherein the second parameter is determined based on at least one of a processor utilization rate, a processor idle rate, an I/O utilization rate, or an I/O waiting rate.

13. A non-transitory computer readable medium, comprising executable instructions that, when executed by at least one processor, directs the at least one processor to perform operations comprising:
   obtaining file information of a file stored in a storage medium, wherein the file includes at least two data fragments, each two of the at least two data fragments are stored separately in two discontinuous storage units in the storage medium, wherein the file information includes a number of storage units in the storage medium for storing the at least two data fragments, wherein the storage medium is a single disk or a disk array;
   determining a first parameter of the file according to the file information, wherein the first parameter represents an integrity of the at least two data fragments in the storage medium, wherein the determining the first parameter of the file according to the file information includes:
   if the storage medium is the disk array,
      determining a second type of data fragments and a third type of data fragments in the file according to the file information, wherein
         the number of the storage units that each of the second type of data fragments occupies is an integer multiple of a second preset value and a start position and an end position of the each of second type of data fragments are aligned to a stripe width of the storage medium, and
         the number of the storage units that each of the third data fragments occupies is an integer multiple of a second preset value and at least one of a start position or an end position of the each of the second type of data fragments are unaligned to a stripe width of the storage medium;
      determining a second ratio of the number of the second type of data fragments and the third type of data fragments to a total number of the at least two data fragments; and
      designating the second ratio as the first parameter of the file;
   determining whether the first parameter is equal to or smaller than a preset threshold; and
   defragmenting the at least two data fragments in the storage medium if the first parameter is equal to or smaller than the preset threshold.

14. The non-transitory computer readable medium of claim 13, wherein the determining the first parameter of the file according to the file information includes:
   if the storage medium is the single disk,
      determining a first type of data fragments in the file according to the file information, wherein the number of the storage units that each of the first type of data fragments occupies is integer multiple of a first preset value;
   determining a first ratio of the number of the first type of data fragments to the total number of the at least two data fragments; and
   designating the first ratio as the first parameter of the file.

* * * * *